W. S. REYBURN & E. A. W. HUNTER.
Said HUNTER Assignor of half his right to BYRON P. MOULTON.
Coupling for Lightning-Rod.
No. 8,304. Reissued June 25, 1878.
Fig I
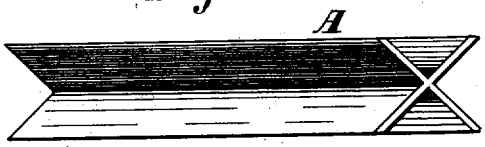
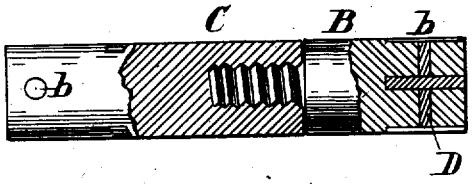
Fig 2
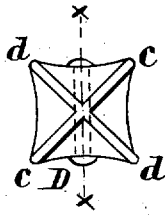
Fig 3
Witnesses
W. C. Corlies
Jno. C. MacGregor
Inventors
William S. Reyburn
Edmund A. W. Hunter
By Coburn & Thacher
Attorneys
N. PETERS, PHOTO-LITHOGRAPHER, WASHINGTON, D. C.

UNITED STATES PATENT OFFICE.

WILLIAM S. REYBURN AND EDMOND A. W. HUNTER, OF PHILADELPHIA, PENNSYLVANIA; SAID HUNTER ASSIGNOR OF ONE-HALF HIS RIGHT TO BYRON P. MOULTON.

IMPROVEMENT IN COUPLINGS FOR LIGHTNING-RODS.

Specification forming part of Letters Patent No. 90,578, dated May 25, 1869; Reissue No. 8,304, dated June 25, 1878; application filed April 3, 1878.

*To all whom it may concern:*

Be it known that we, WILLIAM S. REYBURN and EDMOND A. W. HUNTER, of Philadelphia, in the county of Philadelphia and State of Pennsylvania, have invented certain new and useful Improvements in Lightning-Rod Couplings, which are fully set forth in the following specification, reference being had to the accompanying drawings, in which—

Figure 1 represents a perspective view of a section of the lightning-rod; Fig. 2, a longitudinal section of the coupling, with rod attached, the section being through the line *x x*, Fig. 3. Fig. 3 is an end view of one part of the coupling, showing the slits by which the coupling is attached to the rod.

Similar letters of reference indicate corresponding parts.

Our invention relates to an improvement in couplings for lightning-rods or lightning-conductors, whereby rods of a new and improved style, possessing superior conducting power, are united in a very simple and durable manner.

The invention consists in a coupling composed of two parts, each provided with a receptacle, seat, or socket adapted to receive and hold the end of the rod, and connected together by means of a male and female screw.

It also consist in the combination of the coupling-pieces, provided with receptacles or sockets for the ends of the rods, with pins passing through the couplings, and rods to fasten them together.

It also consists in the special construction of the socket-coupling pieces, as will be hereinafter more fully set forth.

In the drawings, A represents a section of a lightning-rod, which, in this example, is made with four wings or flanges, without a central core; but this form is given simply as an illustration, and our invention is not limited to lightning-rods of this particular form.

The coupling by means of which the sections of the rod are joined together is composed of two parts, B and C. These two pieces are made of cast metal, and at one end are constructed with seats or sockets, by means of which they are adapted to receive the ends of the rods.

In this example of our invention the coupling-pieces are cast solid, and in one end of each slits, recesses, or sockets *c* and *d* are made, either by setting core-plates in the mold or in any other suitable manner. The ends may be cast entirely solid, and the recesses made by sawing into them afterward, if desired. These slits or recesses correspond to the cross-section of the rod, so that they will receive the end of the latter. They are made sufficiently deep in the ends of the couplings to give the rod good hold, so that it may be securely fastened by riveting or otherwise.

When a rivet is used, the pin D is passed through holes *b* in the coupling-pieces, and also through the ends of the rod, so that the latter are firmly secured to the couplings.

One member, B, of the coupling is provided with a male screw, and the other, C, with a female screw, by means of which the two parts are connected together, as shown in the drawings, thereby also connecting together the two sections of rod to which they are respectively attached.

All drilling and other necessary work preparatory to putting up and coupling the sections of the rod are done at the shop, so that the putting up or hanging of the rod is performed with great ease and rapidity.

The recesses in the coupling-pieces must, of course, be adapted to the form of the flanged rod which is used, so that, whatever the form, a firm seat for the end of the rod will be provided in the end of each coupling-piece.

Having thus described our invention, what we claim as new, and desire to secure by Letters Patent, is—

1. A metallic coupling for lightning-rods consisting of two parts, provided with a male and female screw, by means of which they are connected together, and each having a recess or socket in one end adapted to receive and hold the end of the rod, substantially as described.

2. The metallic coupling-pieces B C, provided with a recess or socket at one end adapted to receive the end of the rod, in combination with the rod-sections A and the fastening-pins D, substantially as described.

3. The angular or flanged rod-sections A, in combination with the coupling-pieces B C, having slits or recesses *c* and *d* in their ends, corresponding to the flanges of the rod-sections which they are adapted to receive, substantially as described.

WILLIAM S. REYBURN.
EDMOND A. W. HUNTER.

Witnesses:
JNO. TAYLOR,
ALFRED H. BRIDGE.